Dec. 1, 1942. R. MAYNE ET AL 2,303,945

TRACK LAYING APPARATUS

Filed Feb. 28, 1941

Inventors
Robert Mayne
Kimball D. Smith
By Willis F. Avery
Att'y

Patented Dec. 1, 1942

2,303,945

UNITED STATES PATENT OFFICE 2,303,945

TRACK LAYING APPARATUS

Robert Mayne and Kimball D. Smith, Akron, Ohio, assignors to The B. F. Goodrich Company, New York, N. Y., a corporation of New York Application February 28, 1941, Serial No. 381,090

3 Claims. (Cl. 305—9)

This invention relates to track-laying apparatus for the self-laying track type of vehicles, and more especially to track driving and guiding wheels therefor and to the cooperation of such wheels with the tracks.

In the construction of vehicles of the self-laying track type it has been proposed to provide a flexible endless track mounted about a drive pulley having sprocket teeth for driving and guiding it and a plurality of guiding wheels adapted to tension and guide the track and to support the vehicle from a flattened reach of the track. As such vehicles have been operated over loose soil or soft ground and through water and mud, great abrasion of the wheels and the track have sometimes occurred and considerable noise and vibration has been transmitted to the vehicle.

The principal objects of this invention are to provide reduction of wear and noise, to provide for quick replacement of damaged parts, to provide interchangeability of parts, and to provide superior cushioning of the vehicle.

These and other objects will appear from the following description and the accompanying drawing.

Figure 1:
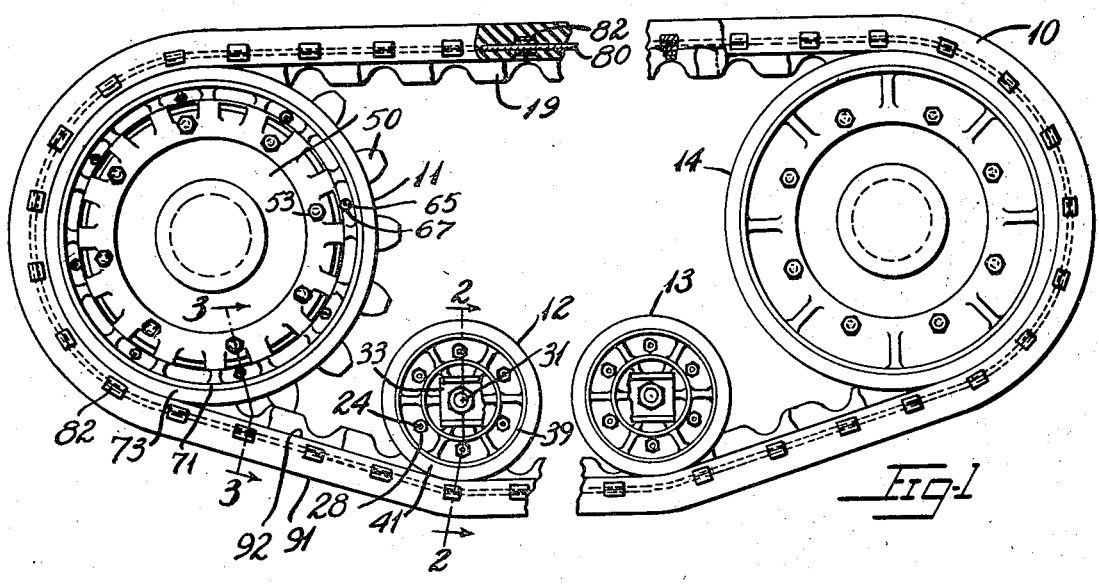
Fig. 1 is a side elevation of the track and track-laying apparatus constructed in accordance with and embodying the invention, parts being broken away and parts shown in section.

In accordance with the invention the driving and guiding wheels are provided with spaced-apart guiding flanges of radially extending annular form adapted to straddle and guide the driving lugs of a flexible endless track. The guiding flanges are flanked on their outer faces with removably secured metal rims having wearing faces of rubber-like material mounted thereon or vulcanized thereto which contact with the back face of the track and resiliently support the vehicle therefrom. The track is also preferably of a construction having endless metallic cables enclosed by a body or bodies of resilient rubber-like material and having metallic crossbars for holding the cables in spaced relation and for engaging with a sprocket of the driving wheel so that the rubber cushion body of the track and the cushion tread of the driving and guiding wheels act together to provide improved cushioning of the vehicle and good traction.

Referring to the drawing, the numeral 10 designates a flexible track, 11 a guiding and driving wheel, and 12, 13 and 14 guiding wheels for guiding the track and supporting the vehicle therefrom.

The guiding wheels 12, 13 are smaller than guiding wheel 14 and are used principally to support the load of the vehicle from the track, but their construction may be similar to that of the guiding wheel 14. A number of these small wheels may be employed depending upon the length of the ground-engaging reach of the track and the load to be supported therefrom. Two such small wheels are shown in the drawing for illustration, the section therebetween being broken away.

Each of the guide wheels, as for example wheel 12, is formed with a hollow hub 15 having a pair of spaced-apart radially extending annular flanges 16, 17 providing an annular groove 18 therebetween adapted to receive and guide the driving members 19 of the flexible track. These annular flanges are preferably of hardened metal so as to provide great resistance to wear caused by contact with the driving members 19 and with the soil deposited thereon. Each flange is machined on its outer face to provide radial seats 20, 21 for receiving the radial flanges of a pair of annular rims 22, 23 of L-shaped cross-section, to which seats the rims are removably secured by annularly spaced-apart studs 24 fixed to the flanges 16, 17 and extending through clearance openings in the rims. The flanges also provide dowel shoulders 25, 26 for centering the rims with respect to the hub. Nuts 27, 28, preferably of hexagon form are threaded on the studs for holding the rims in place, and lock washers 29, 30 are provided between the nuts and the flanges 16, 17 to lock the nuts in position.

The hub of the wheel may be of any desired construction. As shown, it is rotatably mounted about a shaft 31 which is non-rotatably mounted in the frame members 32, 33 of a bogie. Ball bearings 34 having rolling contact with a race 35 seated on the shaft and a race 36 seated in the end of the hub support one end of the hub from the shaft and the other end is supported in similar fashion by ball bearings 37.

The removable rims 22, 23 have outwardly projecting flanges 38, 39 to which treads 40, 41 of resilient rubber-like material of substantial thickness and cushioning properties are secured as by vulcanization. For securing the treads the flanges are preferably rough machined to provide a serrated surface as at 42 to which the rubber-like material is secured by vulcanization as well as by mechanical interlocking, the serration providing a greater surface for adhesion and an interlock to resist slippage or loosening of the tread.

The treads 40, 41 may be grooved as at 43 or otherwise to provide greater resilience if desired, although this is not in all cases necessary. The treads directly support the load of the vehicle from the track. To provide clearance for lateral bulging of the treads under compression, these are spaced apart from the flanges 16, 17 as at 44.

Figure 3:
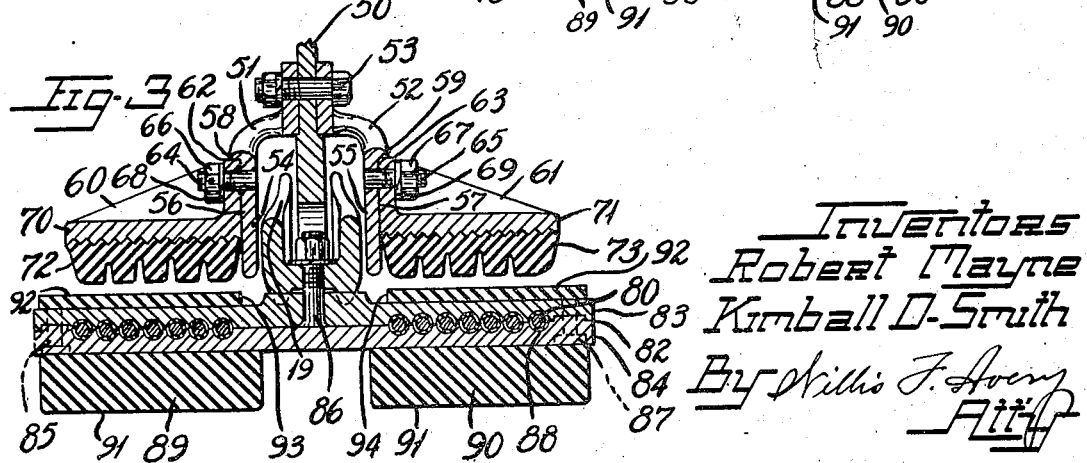
Fig. 3 is a cross-sectional view taken along line 3—3 of Fig. 1 showing the construction of the drive wheel and the track.

The driving wheel of the vehicle may be constructed in similar manner. As illustrated in Figs. 1 and 3 it is formed of a driven sprocket disc 50 the sides of which are machined to receive a pair of annular guide flange members 51, 52 secured thereto by bolts 53. Flange members 51, 52 are provided with radial flanges 54, 55 spaced apart from the sprocket 50 to provide annular grooves adjacent the sides of the sprocket to receive and guide the driving members 19 of the track.

The flanges 54, 55 are machined on their outer faces to provide radially extending seats 56, 57, and dowel shoulders 58, 59, inwardly adjacent thereto for seating a pair of removable rims 60, 61. The rims are of annular form and L-shaped in cross section, having radial flanges 62, 63 for seating on the flange members and secured thereto by studs 64, 65 mounted in the flange members and passing through clearance openings in the rims. Nuts 66, 67 and lock washers 68, 69 are mounted on the studs for holding the rims in place.

The rims 60, 61 have cylindrical flanges 70, 71 having resilient treads 72, 73 of rubber-like material vulcanized thereto. These treads are secured in the same manner and are of the same construction as the treads on the guide wheels.

The track comprises spaced-apart convolutions 80 of metallic cable arranged in spaced-apart groups and held in spaced relation by cross-bars 82 of metal. Each cross-bar comprises a pair of complementary cross-bar members 83, 84 secured together as by bolts 85, 86, 87 and having complementary grooves formed in their meeting faces for holding the cables in properly spaced relation. The bars preferably do not touch the cables, but a layer 88 of resilient rubber-like material surrounds the cables and extends between the cables and the bars and is vulcanized to the cables and to the bars to provide a resilient cushion therebetween to transmit the driving load by shear stress of the rubber-like material. Bodies 89, 90 of rubber-like material completely surround the cables and the cross-bars are partially embedded therein. These bodies provide the tread 91 of the track and also provide a smooth facing 92 of rubber-like material over the back of the track to engage the treads of the driving and guiding wheels. The facing 92 is recessed at 93, 94 to provide clearance for the flanges 16, 17 (Fig. 2) and the flanges 54, 55 (Fig. 3).

Figure 2:
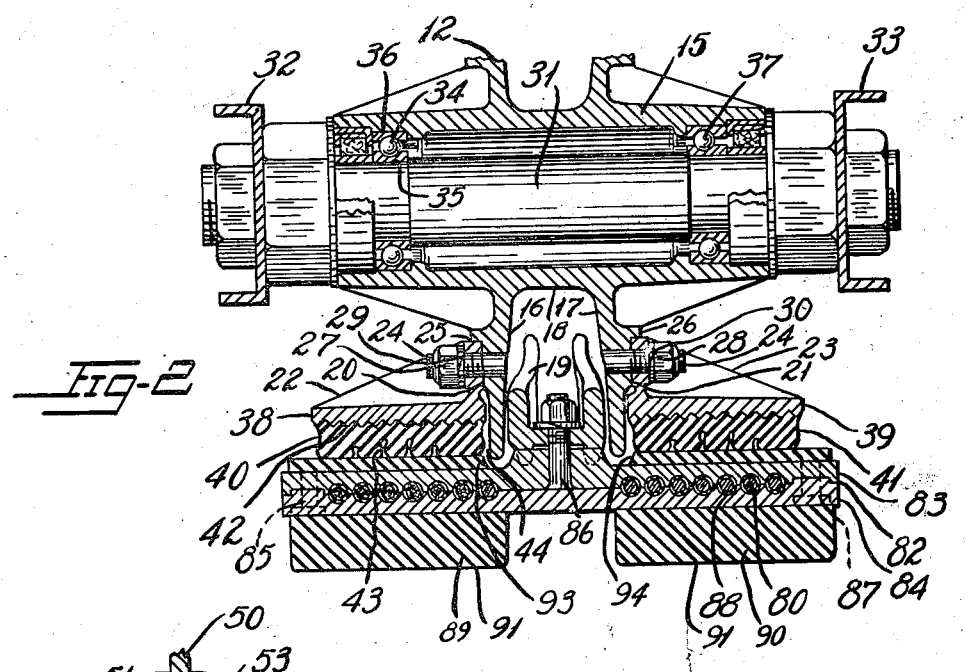
Fig. 2 is a cross section thereof taken along line 2—2 of Fig. 1, showing the construction of the guide wheel and the track, parts being broken away and parts shown in section.

The provision of the grooves 43, which as shown in Figs. 2 and 3 are preferably of substantial penetration in the treads of the removable rims, has the advantage of providing for the passage and expulsion of mud, snow, and other foreign matter from between the wheels and the track, thereby avoiding undesirable stresses on the wheels and the track due to collection of such foreign matter therebetween. The grooves also make possible ventilation of the tread to prevent over-heating of the rubber-like material due to internal friction. A further advantage of the grooves is in permitting spread of the rubber therebetween when under compression, thereby providing for equalizing flow of the non-compressible rubber material without placing severe stresses on the side faces of the rubber tending to tear the rubber from the rim.

The provision of the rubber treads on the guiding and driving wheels eliminates noise, cushions the vehicle, and provides increased resistance to wear. The combination of the rubber treads with the rubber cushion material of the track provides increased cushioning of the vehicle. The removable construction of the tread rims by lateral movement provides for quick repair of the vehicle and for easy replacement of the cushioning members without requiring extensive disassembly. The combination of the metallic guiding flanges with the rubber tracks provides position guiding while nevertheless providing effective cushioning.

Variations may be made without departing from the scope of the invention as it is described in the following claims.

We claim:

1. Track-laying apparatus for a self-laying track-type vehicle, said apparatus comprising a flexible track, a wheel adapted to cooperate with said flexible track, said wheel comprising a hub, spaced-apart radially-extending annular flanges thereon defining an annular groove therebetween for guiding said flexible track, a pair of movable spaced-apart rims each secured to said hub adjacent one of said flanges, and a track-contacting tread of rubber-like material secured to each rim and approximately flush with said flanges when unloaded, said track having a continuous face for contact with said treads and a clearance space for receiving said flanges when said apparatus is under load, and said track-contacting tread having substantially penetrating grooves for the passage of mud and snow and to provide ventilation of the rubber-like material for heat dissipation.

2. The track-laying apparatus for a self-laying track-type vehicle in which a flexible track extends about driving and guiding wheels and a wheel has guide flanges adapted to center the track, said apparatus comprising a pair of removable rim members coaxially secured to said wheel in spaced-apart relation for transmitting the load between the wheel and the track, and resilient treads of rubber-like material secured to said rim members by a vulcanized bond and adapted to bear against said track, said treads being formed with a plurality of substantially penetrating grooves in the tread faces to provide for passage of mud and snow from between the tread and the track and to provide for ventilation of the rubber-like material for heat dissipation.

3. A detachable wheel rim for a wheel of a self-laying track-type vehicle for cooperation with a band track, said rim comprising a radial flange adapted to be secured to the wheel, an axially disposed flange integral therewith, and a tread of rubber-like material on the outer face of said axially disposed flange and secured thereto by a bond of vulcanization, said tread having a plurality of substantially penetrating grooves in its track-contacting face for the passage of mud and snow and to provide for ventilation of the rubber-like material for heat dissipation.

ROBERT MAYNE.
KIMBALL D. SMITH.